United States Patent

[11] 3,525,351

| [72] | Inventors | Hoel L. Bowditch<br>Foxboro, Massachusetts;<br>George F. Williams, Riverside, Rhode Island |
|---|---|---|
| [21] | Appl. No. | 772,597 |
| [22] | Filed | Nov. 1, 1968 |
| [45] | Patented | Aug. 25, 1970 |
| [73] | Assignee | The Foxboro Company<br>Foxboro, Massachusetts<br>a corporation of Massachusetts |

[54] FLUID INSTRUMENT RECEIVER-TRANSMITTER
7 Claims, 15 Drawing Figs.

| [52] | U.S. Cl. | 137/85 |
|---|---|---|
| [51] | Int. Cl. | F15b 5/00 |
| [50] | Field of Search | 137/82, 85 |

[56] References Cited
UNITED STATES PATENTS
2,763,278  9/1956  Eller et al. ............... 137/82

*Primary Examiner*— Robert G. Nilson
*Attorney*— Lawrence H. Poeton

ABSTRACT: For fluid instrument devices, a receiver-transmitter unitary assembly changeable by switch action from one to the other of the operative modes of receiver and transmitter in which both modes are operated through at least a part of the same nozzle-baffle device, wherein the receiver mode is fluid signal input to mechanical position, and the transmitter mode is mechanical position to fluid signal output. The receiver positionable device is a transmitter element in the transmitter mode. A clutching device is used to free a mechanical system for the receiver mode, and to engage the mechanical system for the transmitter mode.

INVENTORS
HOEL L. BOWDITCH
GEORGE F. WILLIAMS
BY
Lawrence H. Porter
AGENT

Patented Aug. 25, 1970

INVENTORS
HOEL L. BOWDITCH
GEORGE F. WILLIAMS
BY
Lawrence H. Poeton
AGENT

INVENTOR.
HOEL L. BOWDITCH
GEORGE F. WILLIAMS
BY Lawrence H. Poston
AGENT

FLUID INSTRUMENT RECEIVER-TRANSMITTER

This invention relates to process and energy control systems, and has particular reference to fluid operated systems, and operating sections or stations within such systems.

Fluid signals representative of various process or energy conditions, parameters or adjustments, or of various situations, conditions, or adjustments of or within the systems, are received or transmitted in or from suitably located and operated areas or stations.

Manual adjustment is often desirable, and mechanical position representation of fluid signals is often necessary, in position terms other than and beyond mere signal indication.

This invention provides a unitary nozzle-baffle assembly which combines such receiver-transmitter functions in a compact, efficient and simple form to provide a receiver-transmitter unit which may be used as a manual control system in conjunction with an automatic control system (not shown herein), in close, readily separable and independently operable association therewith, or as a remote unit, singly or in duplication at several locations. Such an arrangement provides substantially increased control flexibility while maintaining system integrity, reliability and repeatability.

The device of this invention lends itself to bumpless, balanceless transfer in either direction between the conditions of automatic and manual control, and without intermediate steps.

Within the receiver-transmitter unit of this invention, changes from mode-to-mode as between the receiver and transmitter mode, are made without intermediate steps, such as matching or balancing.

This invention comprises a combination, for example, of a nozzle-baffle and bellows assembly with an associated fluid system, and an associated mechanical system.

In this invention, as a receiver, a sector arm is positioned in accordance with and in representation of a fluid input signal. As a transmitter, the sector arm is moved manually, for example, by an adjustment wheel against the sector arm, to provide a fluid output signal in accordance with the representative of the adjustment of the sector arm. The wheel is clutched away from the sector arm in the receiver mode, and against the sector arm in the transmitter mode.

Thus, when the change from receiver to transmitter is made, the transmitting starting position of the sector arm produces a fluid output signal exactly the same as the fluid input signal at the time of the mode change. Bumpless mode change is achieved in this fashion, and by maintaining a normal nozzle-baffle relation during the receiver mode.

The receiver-transmitter unit of this invention is provided with manual memory indicator pointers to define normal signal value for either mode, either as a range, or as a single value. In association with the memory indicator pointers an actual signal value is indicated, continuously indicating the signal as received or as transmitted. The direction of rotation of the adjustment wheel is indicative of the direction of signal output in the transmitter mode so that manual operation may be made knowledgeably as to the direction of its effect.

With the adjustment wheel engaging the sector of the sector level in the transmitter mode the transmitted fluid signal cannot drift, and will remain constant until further manual adjustment is made, or the mode is changed to that of receiver.

The mode of this unit is changed by operating a fluid switch in the fluid system associated with the nozzle-baffle assembly. In the receiver mode, movement is produced in the nozzle-baffle assembly without change in the nozzle-baffle relation. The nozzle back-pressure is cut-off from the bellows, and the nozzle air jet is balanced against a spring and linkage arrangement which maintains the nozzle-baffle pressure and spaced relation such that when the change is made to the transmitter mode, there is no fluid signal bump in the system because of changed nozzle jet or pressure.

Consequently bumpless transfer from receiver-transmitter mode is provided through two factors; the tracking of an input signal by a receiver element mechanically positioned thereby, and the maintainence of the nozzle pressure normal value as applied to the baffle. In the transmitter mode, movement is produced in the nozzle baffle assembly with effective back-pressure change from the nozzle.

Other objects and advantages of this invention will be in part apparent and part pointed out hereinafter and in the accompanying drawings, wherein.

In the drawings presented herewith, like reference numbers are applied to like elements throughout the various figures.

Figure 1:
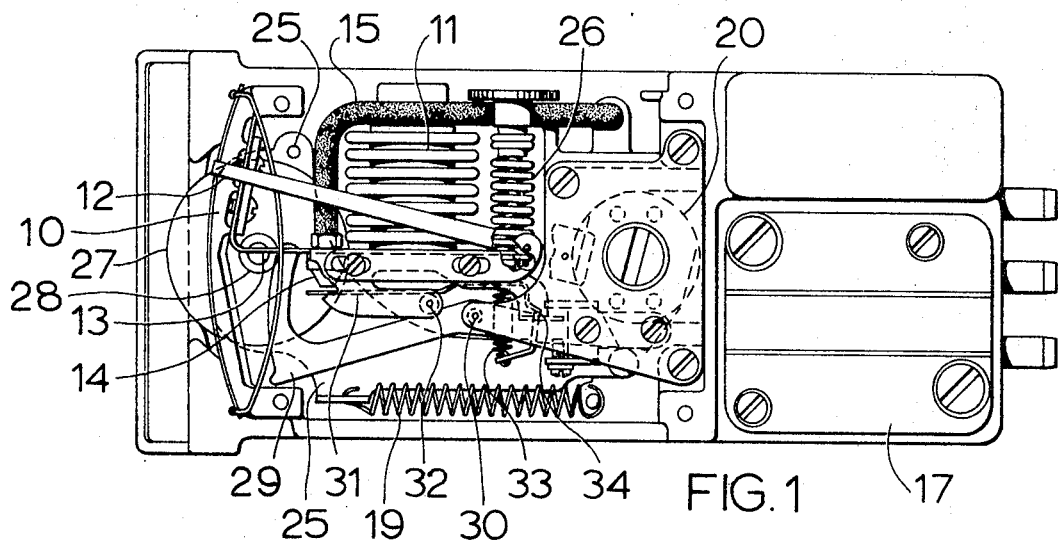
FIG. 1 is a top view of a receiver-transmitter structure according to this invention.
Figure 2:
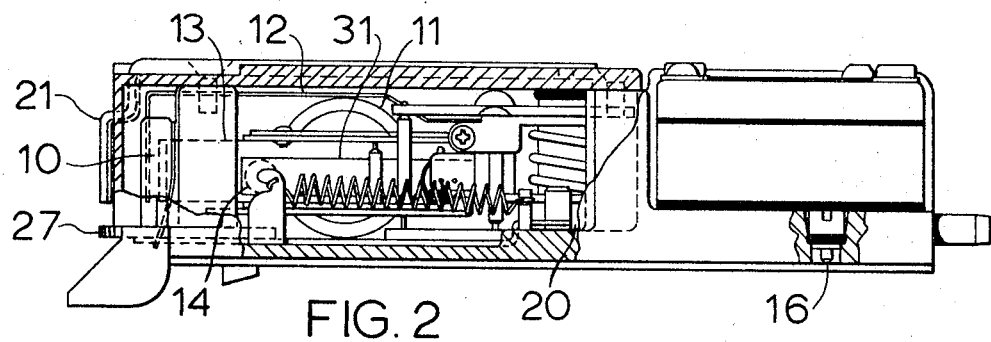
FIG. 2 is a side view of the FIG. 1 structure, the top side as seen in FIG. 1.
Figure 3:
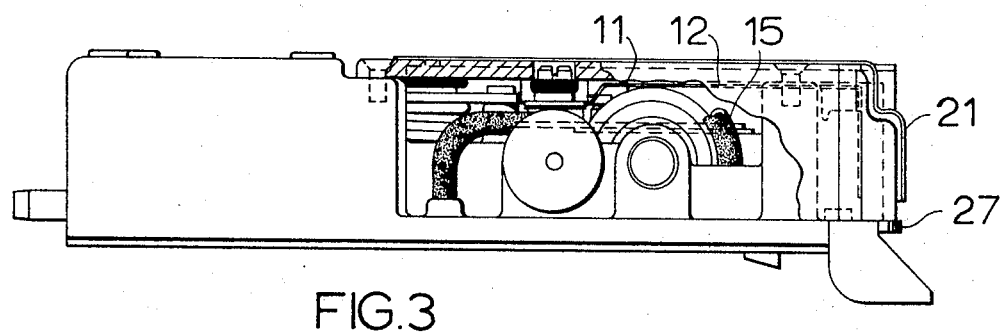
FIG. 3 is the other side view of the FIG. 1 structure, the bottom side as seen in FIG. 1.
Figure 4:
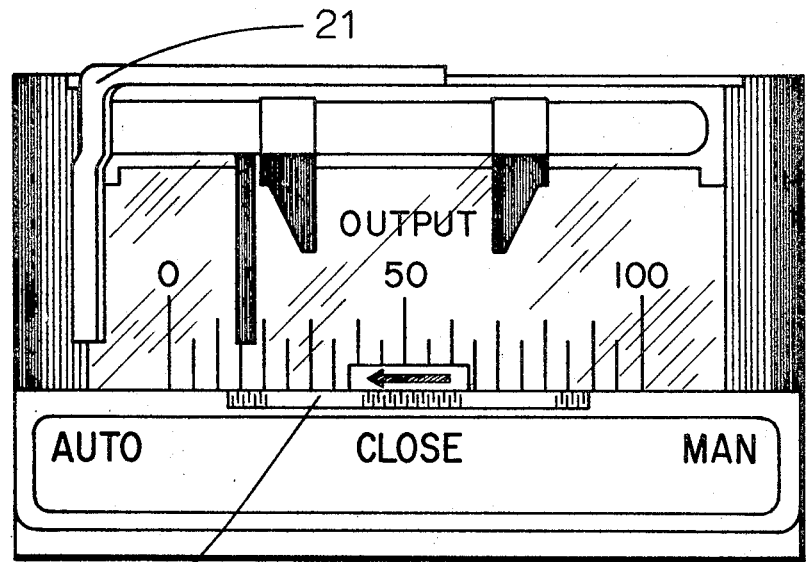
FIG. 4 is the front view of the FIG. 1 structure.
Figure 5:
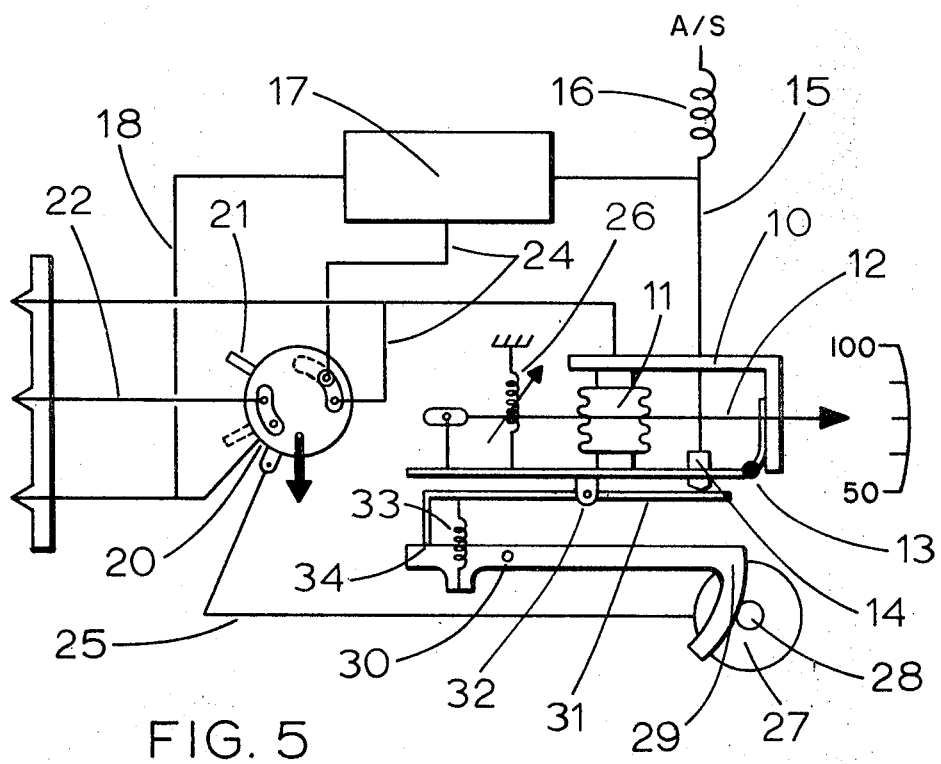
FIG. 5 is an illustrative schematic of the FIG. 1 structure, with the positions and locations of the various elements set forth in functional illustration according to the operation of the structure of FIG. 1.

The schematic of FIG. 5 sets forth the function system of this invention, with representations of the elements thereof, in the function arrangement, but not necessarily the actual physical layout, of the structure of FIGS. 1 through 4.

In FIG. 5, a fixed support 10 has the fixed end of a bellows 11 mounted thereon. An indicator 12 is provided for showing a representation of the fluid signal (pressure) in the bellows 11 in accordance with movement of a flexure 13 which is also mounted on said fixed support 10 and which engages the movable end of the bellows and consequently moves with the expansion and contraction of the bellows as the fluid signal therein changes. An adjustable zero spring 26 biases the flexure 13 against the bellows 11.

A nozzle 14 is mounted in and through the flexure 13, and moves somewhat with the movement of the flexure, but less than the bellows-contacted portion of the flexure, since the nozzle is closer to the pivot area of the flexure.

The nozzle 14 has a fluid input line 15 from fluid supply, usually air, through a restrictor 16 with the line 15 directly connected to a relay 17 to provide a back-pressure, relay actuating signal in the usual manner of such relay actuations.

A fluid power supply line 22 to a two-position fluid switch 20 is applied to the relay 17 through one position of the switch 20 and a feed line 18. The output of the relay 17, when it is operated, is applied through an output line 24 to the bellows 11 and the input-output line thereto.

The fluid switch 20 is shown in position for the transmitter mode with mechanical switch operating means indicated at 21. The receiver mode switch position is indicated by dotted lines. Suitable vent means as indicated, is provided for the fluid switch 20.

As shown, operation of the fluid switch 20 changes the fluid system of this device, according to the desired mode. The switch 20 also changes the mechanical system of this device, simultaneously with the fluid system change, for the proper mode arrangement of the mechanical system. This mechanical change is accomplished through a switch lever arrangement 25, as pivoted at 25'.

The switch lever 25 moves a manual actuator wheel 27 so as to engage and disengage a boss 28, on the wheel, with the sector of a sector lever 29. In the receiver mode, the boss 28 is disengaged from the sector 29 and the sector is free to change position in response to a fluid signal input to the bellows 11. In the transmitter mode, the boss 28 engages the sector 29, and rotation of the wheel 27 produces, through the nozzle-baffle system, a fluid output pressure in the relay 17 output, in a manual control station function.

The sector lever 29 is pivoted at 30, and the baffle 31, pivoted from the flexure 13 at the support point 32, has one end held against the sector lever 29 by a spring 33, with the point of this engagement 34, and the spring 33 both located beyond the sector pivot 30 with respect to the sector form of the lever 29.

Accordingly, this invention provides a transmitter-receiver unit wherein a fluid switch alters both the fluid system and the mechanical system in the change from one mode to the other, the mechanical change comprising engagement and disengagement of the actuating wheel boss, and the fluid system change comprising making the nozzle 14 back-pressure effective on the bellows 11 in the transmitter (manual control) mode, and ineffective in the receiver mode. In the receiver mode the relay output is cut-off from the bellows 11, but air still flows from the nozzle 14, from its air supply, through the restrictor 16 and line 15. A further restrictor, not shown, may be used in the line 15 near the nozzle for damping effect.

Figure 12:
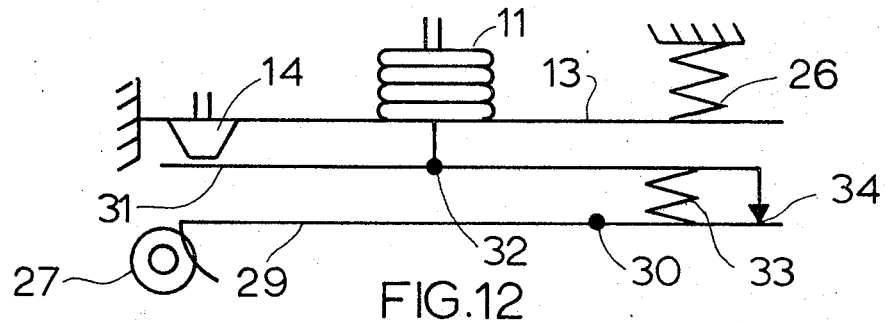
FIGS. 12 and 13 illustrate receiver mode operation of the device according to this invention.
Figure 13:
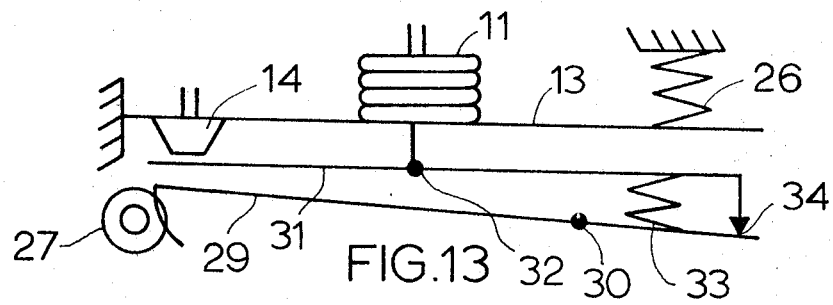

In the receiver mode, an input signal increase to the bellows 11 causes the flexure 13 and the baffle 31 to move together against the sector lever to cause it to pivot to a new position. The sector lever is free to do this, since it is disengaged from the actuating wheel boss 28. See FIGS. 12 and 13.

When the shift is made to the transmitter mode, the actuating wheel boss 28 is moved into engagement with the sector 29 at a new location thereon as established by the movement of the sector about its pivot 30 during the receiver mode action.

Figure 14:
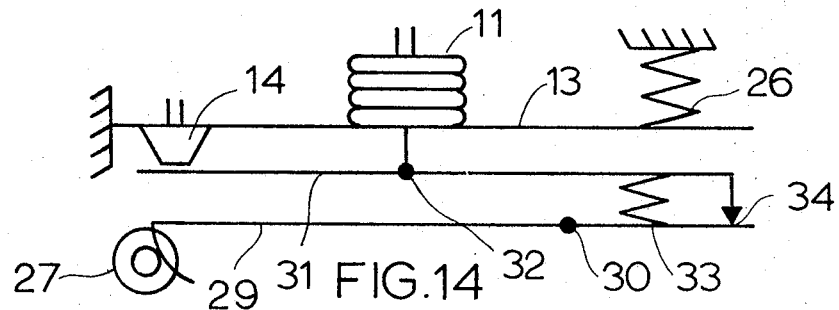
FIGS. 14 and 15 similarly illustrate transmitter mode (manual control) operation of the device according to this invention.
Figure 15:
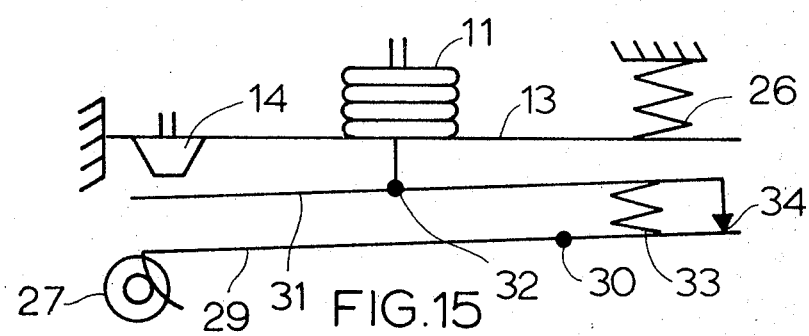

In the transmitter mode, rotation of the wheel 27 causes both the sector lever and the baffle 31 to pivot, thus varying the restriction of the nozzle 14 and producing a fluid output pressure since the relay 17 output is connected into the system in this transmitter, manual control mode of this device. See FIGS. 14 and 15.

FIGS. 6 through 11 show structural details of the mechanical system of this device.

Figure 9:
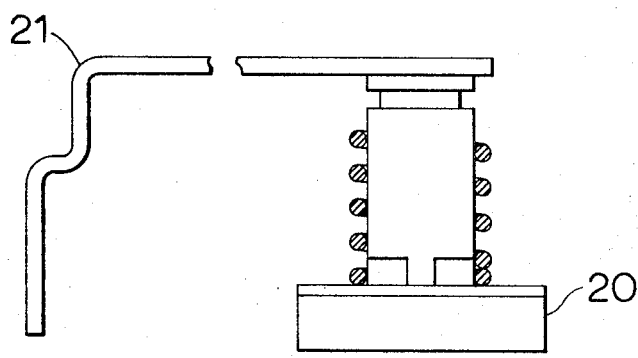
FIG. 9 is an illustration of the fluid switch and the operating arm therefor.

FIG. 9 shows an actuator lever 21 for the fluid switch 20. It also appears in FIGS. 2, 3, and 4. From a depending leg at the front end of the device it extends backward along the top thereof and then downward to the switch 20, spring pressed into assembly at the back of the device.

Figure 6:
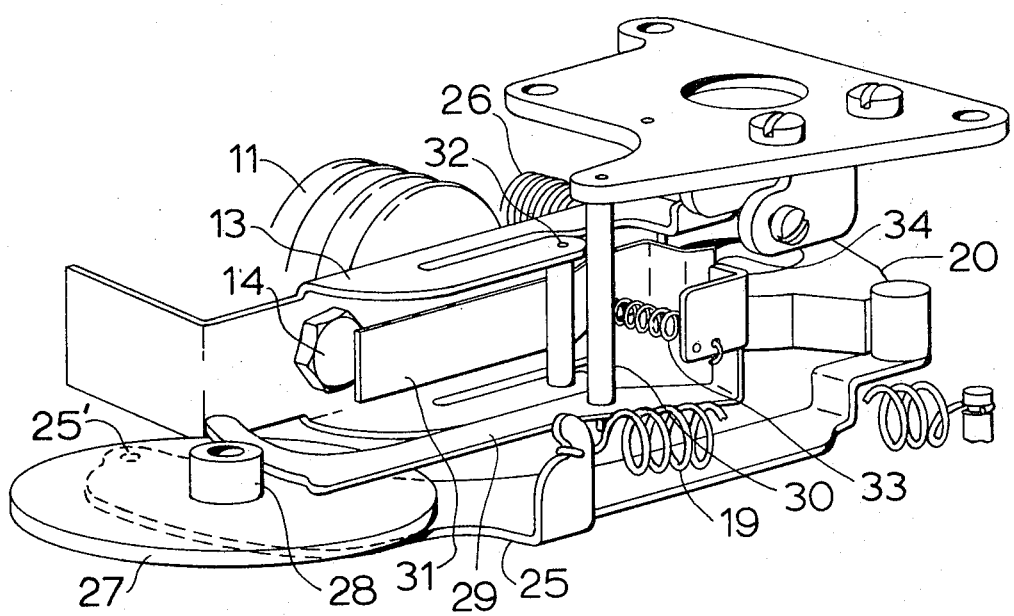
FIG. 6 is a perspective of the mechanical system according to this invention.

FIG. 6 and others, show the fluid switch 20 with a cam formation for operation against a member on the switch lever 25. A spring for maintaining this engagement is provided at 19.

Figure 7:
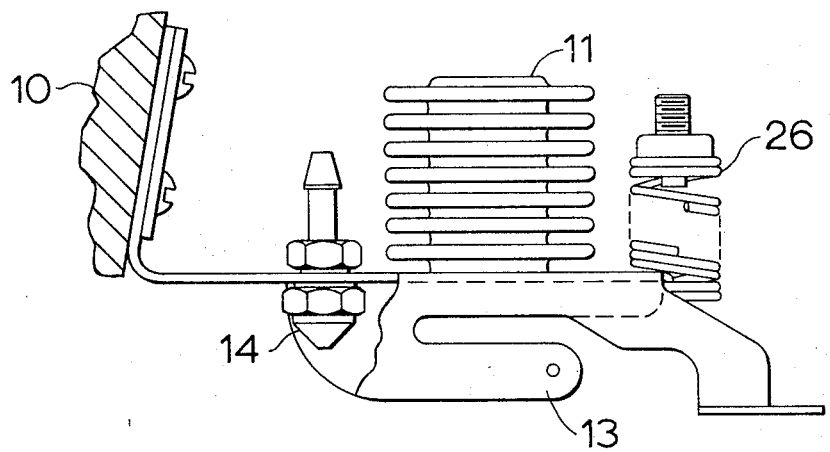
FIG. 7 is a showing of the nozzle and bellows of this system, as mounted on the support flexure therefor.
Figure 8:
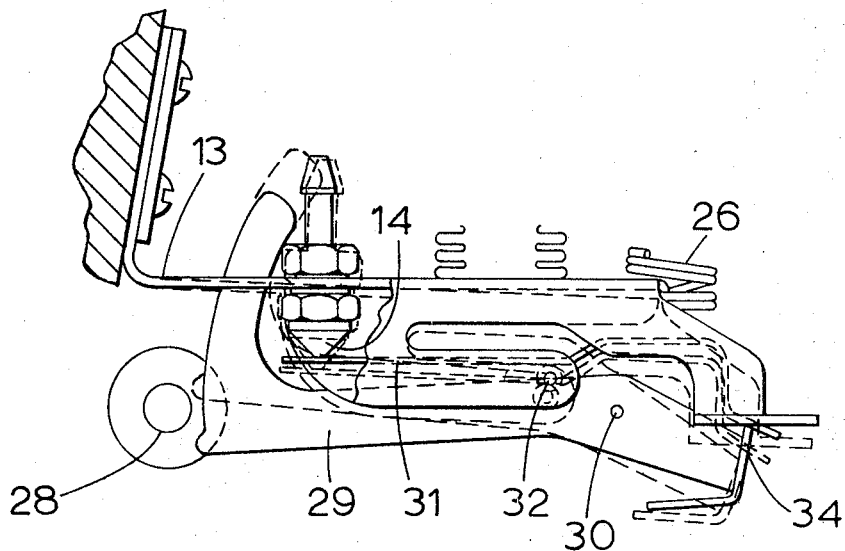
FIG. 8 is a development of the FIG. 7 showing, including the baffle for the nozzle, the sector lever and the actuating wheel therefor.

The flexure 13 form and nozzle-bellows mounting thereon is illustrated in FIG. 7 with FIG. 8 showing the same structure plus the rest of the mechanical system, comprising the baffle 31, the sector lever 29 and the actuator wheel 27 with its sector-engaging boss 28.

Figure 10:
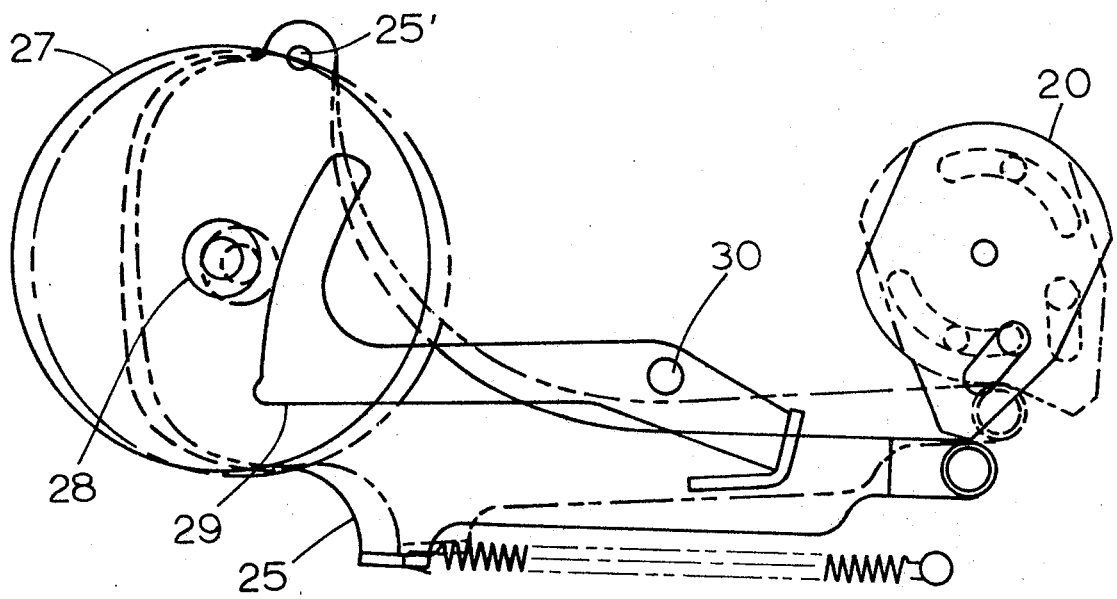
FIGS. 10 and 11 illustrate the mechanical effect of the fluid switch in terms of engaging and disengaging the actuator wheel boss with respect to the sector lever. This is the mechanical portion of the mode changing action of the fluid switch.
Figure 11:
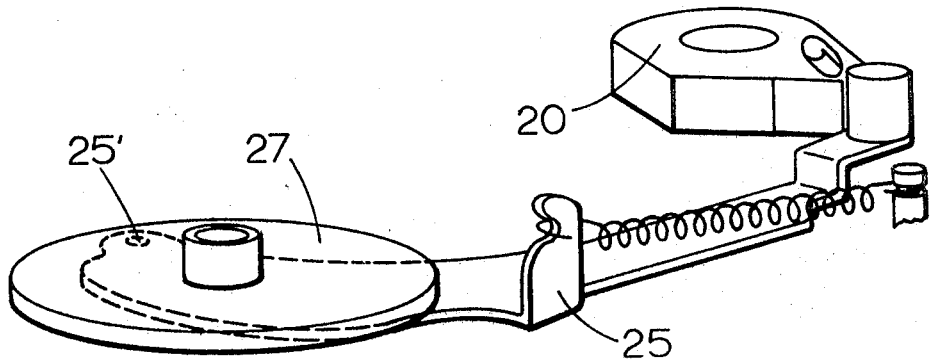

FIGS. 10 and 11 are in further clarification of the operation of the switch lever by the fluid switch in the course of changing from one to the other of the transmitter and receiver modes of this device.

In the receiver mode the flexure 13 and the baffle 31 are maintained essentially as a parrallelogram and the nozzle-baffle relation is maintained, with the spring 33 balanced against the air flow from the nozzle 14. The baffle is in engagement, at 34, with the sector arm 29, also by means of the spring 33. This arrangement, in combination with the non-aligned pivot points 32 and 30 of the baffle and sector arm respectively, produce a bias tending to move the baffle toward the nozzle 14. Thus in the receiver mode, the baffle 31 and the sector arm 29 float on the nozzle flow, and settle out at the zero relation of the nozzle and baffle after any upset. Thus, the nozzle back-pressure is always settled out to the same value so that when the mode is changed from receiver to transmitter, there is no fluid signal bump. The sector arm is in the received signal position when the adjustment wheel 27 is re-engaged therewith and the nozzle pressure is at normal, to accomplish this bumpless transfer.

This invention therefore provides a new and useful instrument control station in the form of a receiver-transmitter, independently operable as a manual control, and capable of shifting modes without surge, in a bumpless mode change, without intermediate steps and without intermediate matching or balancing.

As many embodiments may be made of the above invention, and as changes may be made in the embodiment set forth above without departing from the scope of the invention, it is to be understood that all matter herein before set forth and in the accompanying drawings is to be interpreted as illustrative only and not in a limiting sense.

We claim:

1. For use in process and energy instrumentation, in fluid operated systems therefor:

a fluid operated receiver-transmitter unit selectively capable of the two operative modes of receiver and transmitter, one only of said modes being effective at any one time;

wherein, in said receiver mode, said unit translates an incoming signal into a receiver position in response to and representative of said incoming signal;

and wherein, in said transmitter mode, said unit translates a receiver position, as a transmitter position, into a fluid output signal;

said receiver-transmitter unit comprising, in combination;

a nozzle-baffle assembly, and means responsive to a fluid operating signal and arranged to move at least one part of said nozzle-baffle assembly in response to said operating signal;

a fluid supply and nozzle-back-pressure system including said nozzle, said fluid operating signal responsive means, and fluid input-output connection means to said fluid operating signal responsive means;

whereby, in the receiver mode, a fluid input signal to said fluid signal responsive means is translated into a receiver position representative of said signal, by said movement in said nozzle-baffle assembly;

and whereby, in the transmitter mode, a receiver position change as a transmitter position change, is translated into a fluid output signal in said nozzle back pressure system by movement in said nozzle-baffle assembly in response to said transmitter position change;

and fluid switch means for changing said unit from one to the other of said transmitter and receiver modes; and wherein in the receiver mode said baffle is moved without effective change in its relation to said nozzle and in the transmitter mode said baffle is moved with respect to said nozzle to change fluid back pressure from said nozzle.

2. For use in process and energy instrumentation, in fluid operated systems therefor:

a fluid operated receiver-transmitter unit selectively capable of the two operative modes of receiver and transmitter, one only of said modes being effective at any one time;

wherein, in said receiver mode, said unit translates an incoming signal into a receiver position in response to and representative of said incoming signal;

and wherein, in said transmitter mode, said unit translates a receiver position, as a transmitter position, into a fluid output signal;

said receiver-transmitter unit comprising, in combination;

a nozzle-baffle assembly, and means responsive to a fluid operating signal and arranged to move at least one part of said nozzle-baffle assembly in response to said operating signal;

a fluid supply and nozzle-back-pressure system including said nozzle, said fluid operating signal responsive means, and fluid input-output connection means to said fluid operating signal responsive means;

whereby, in the receiver mode, a fluid input signal to said fluid signal responsive means is translated into a receiver position representative of said signal, by said movement in said nozzle-baffle assembly;

and whereby, in the transmitter mode, a receiver position change as a transmitter position change, is translated into a fluid output signal in said nozzle back pressure system by movement in said nozzle-baffle assembly in response to said transmitter position change;

and fluid switch means for changing said unit from one to the other of said transmitter and receiver modes;

wherein a sector member is provided as movable means to achieve said receiver position, and wherein said sector member is also the means of translating said receiver position, as a transmitter position, into a fluid output signal.

3. For use in process and energy instrumentation, in fluid operated systems therefor:
a fluid operated receiver-transmitter unit selectively capable of the two operative modes of receiver and transmitter, one only of said modes being effective at any one time;

wherein, in said receiver mode, said unit translates an incoming signal into a receiver position in response to and representative of said incoming signal;

and wherein, in said transmitter mode, said unit translates a receiver position, as a transmitter position, into a fluid output signal;

said receiver-transmitter unit comprising, in combination;

a nozzle-baffle assembly, and means responsive to a fluid operating signal and arranged to move at least one part of said nozzle-baffle assembly in response to said operating signal;

a fluid supply and nozzle-back-pressure system including said nozzle, said fluid operating signal responsive means, and fluid input-output connection means to said fluid operating signal responsive means;

whereby, in the receiver mode, a fluid input signal to said fluid signal responsive means is translated into a receiver position representative of said signal, by said movement in said nozzle-baffle assembly;

and whereby, in the transmitter mode, a receiver position change as a transmitter position change, is translated into a fluid output signal in said nozzle back pressure system by movement in said nozzle-baffle assembly in response to said transmitter position change;

and fluid switch means for changing said unit from one to the other of said transmitter and receiver modes;

wherein manual means is provided for achieving said nozzle-baffle movement in the transmitter mode, connection means is provided for bringing said manual means into operation in said transmitter mode, and for taking said manual means out of operation in said receiver mode, said connection means being provided between said fluid switch means and said manual means whereby actuation of said fluid switch means results in one of said actions of bringing said manual means into operation and taking said manual means out of operation.

4. A fluid operated instrument system manual control station having two modes of operation, a receiver mode and a transmitter mode, with a fluid switch for changing said station from one of said modes to the other:
said station comprising a nozzle-baffle-bellows assembly, a fluid system having an input-output fluid connection to said bellows, a connection between said nozzle and said bellows through said fluid switch;

a mechanical system operatively connected to said baffle, said mechanical system including a sector lever and an actuating wheel adjustable into and out of engagement with the sector of said sector lever;

and a mechanical connection between said fluid switch and said actuating wheel to accomplish said wheel adjustment when said switch is operated;

whereby said fluid switch, in its operation, accomplishes mode change both in said fluid system and in said mechanical system.

5. A manual control station according to claim 4 wherein said receiver mode comprises adjustment of said actuating wheel out of engagement with said sector lever whereby said sector lever is free of said actuating wheel and thus free to change position in response to and in representation of fluid input signals to said bellows, said sector lever and said baffle together in this mode, being in floating condition balanced between a spring action and air flow from said nozzle, under a biasing effect from said spring against air flow from said nozzle.

6. A manual control system according to claim 4 wherein said transmitter mode comprises adjustment of said actuating wheel into engagement with said sector lever whereby rotation of said actuating wheel activates said mechanical system to vary the restriction of said nozzle by said baffle, and consequently provides a fluid output signal in terms of back-pressure from said nozzle, with said output signal thus responsive to and representative of the position changes of said sector lever in manual control function of said station.

7. A manual control system according to claim 4, with said bellows mounted on a fixed support, a flexure member, also mounted on said fixed support and engaging said bellows for movement in response to expansion and contraction of said bellows, said baffle pivotably supported from said flexure, with said nozzle mounted on said flexure between said baffle support point and the pivot point of said flexure, said baffle having an angled end portion in engagement with said sector lever on one side of the pivot point of said lever, and a resilient connection between said baffle and said sector lever as a means of maintaining said engagement between said baffle and said sector lever, and of maintaining a bias of said baffle against air flow from said nozzle in said receiver mode to establish said baffle and said sector lever in a floating condition, responsive together to bellows movement in said receiver mode without changing the settling out pressure and position relation of said nozzle and baffle.